United States Patent
Kim

(10) Patent No.: US 10,256,632 B2
(45) Date of Patent: Apr. 9, 2019

(54) POWER FACTOR CORRECTION USING POWER FACTOR CORRECTION CIRCUITRY FROM DEACTIVATED CIRCUIT

(71) Applicant: Infineon Technologies Austria AG, Villach (AT)

(72) Inventor: Tae Yong Kim, Yongln (KR)

(73) Assignee: Infineon Technologies Austria AG, Villach (AT)

( * ) Notice: Subject to any disclaimer, the term of this patent is extended or adjusted under 35 U.S.C. 154(b) by 311 days.

(21) Appl. No.: 14/981,063

(22) Filed: Dec. 28, 2015

(65) Prior Publication Data

US 2017/0187185 A1    Jun. 29, 2017

(51) Int. Cl.
*H02M 1/42*    (2007.01)
*H02J 3/18*    (2006.01)

(52) U.S. Cl.
CPC .................... *H02J 3/18* (2013.01)

(58) Field of Classification Search
CPC ................... H02J 3/18; H02M 1/00
USPC ........................................... 307/31
See application file for complete search history.

(56) References Cited

U.S. PATENT DOCUMENTS

| | | | | |
|---|---|---|---|---|
| 7,092,266 B2 * | 8/2006 | Frank | ............. | G05F 1/70 363/65 |
| 2003/0052653 A1 * | 3/2003 | Mendenhall | ........ | H02M 1/4208 323/210 |
| 2011/0080102 A1 * | 4/2011 | Ge | ............. | H05B 33/0815 315/200 R |
| 2012/0026763 A1 * | 2/2012 | Humphrey | ........ | H02M 1/4225 363/65 |

OTHER PUBLICATIONS

Chen, Jian et al., "2nd Generation LLC Current Resonant Control IC, "FA6A00N Series"", Fuji Electric Review, vol. 59., No. 4, 2013, pp. 245-250.

* cited by examiner

*Primary Examiner* — Rexford Barnie
*Assistant Examiner* — Joseph Inge
(74) *Attorney, Agent, or Firm* — Murphy, Bilak & Homiller, PLLC

(57) ABSTRACT

A method of operating a power supply including first and second power converters connected to a load and a power factor correction circuit connected to the power converters includes operating the power supply in a normal power mode such that: the first and second power converters and the power factor correction circuit are active, the first and second power converters each drive their respective load, and the power factor correction circuit performs power factor correction for each circuit formed by the first and second power converters and their respective load, and operating the power supply in an auxiliary power mode such that: both the first power converter and the power factor correction circuit are deactivated and the second power converter is active, the second power converter drives its load, and the second power converter performs power factor correction for a circuit formed between the second power converter and its load.

18 Claims, 3 Drawing Sheets

POWER FACTOR CORRECTION USING POWER FACTOR CORRECTION CIRCUITRY FROM DEACTIVATED CIRCUIT

TECHNICAL FIELD

The instant application relates to power supply techniques and associated circuitry and more particularly relates to power supplies with normal and lower power modes and power factor correction.

BACKGROUND

In consumer electronics, power consumption is becoming an increasingly important design consideration. For example, with regard to television (TV) power supplies, of particular focus is the power consumption of the device during standby mode, i.e., when the device is powered down and awaiting an activation signal. Efficiency standards, such as the Energy Star® standard, require very minimal power consumption (e.g., less than or equal to 270 mW) during standby mode. Efficiency standards also typically contain power factor correction requirements so that reactive power is not wasted in the system through reflection of higher order harmonics. For example, the Energy Star® standard specifies the maximum amplitude of line-frequency harmonics up to an including the $39^{th}$ harmonic.

Power supplies for consumer electronics are typically required to deliver to power to various loads within the device. In many cases, these loads may have different power requirements and may require independent power sources. For this reason, consumer electronics typically include multiple power supplies. In addition, consumer electronics typically include power factor correction circuits to bring the load current in phase with the load voltage and consequently increase the power factor of the circuit.

In a device with multiple power supplies, it can be very difficult to meet standby power mode requirements by using one of the power supplies and its associated control circuitry. One solution is to provide a dedicated auxiliary mode power supply in the device that meets efficiency requirements and delivers all of the necessary power during the auxiliary power mode. However, this solution introduces additional component cost into the device. Furthermore, this solution requires additional area for the auxiliary power supply and thus limits the overall size of the device.

SUMMARY

A method of operating a power supply having first and second power converters each being coupled to a load, and a power factor correction circuit connected to the first and second power converters is disclosed. According to an embodiment, the method includes operating the power supply in a normal power mode such that: the first and second power converters and the power factor correction circuit are active, the first and second power converters each drive their respective load, and the power factor correction circuit performs power factor correction for each circuit formed by the first and second power converters and their respective load. The method further includes operating the power supply in an auxiliary power mode such that: both the first power converter and the power factor correction circuit are deactivated and the second power converter is active, and the second power converter drives its load.

A method of delivering power in an electronic device is disclosed. According to an embodiment, the method includes delivering power independently to first and second loads during a normal power mode. The normal power mode includes powering the first load using a first power converter, powering the second load using a second power converter, and performing power factor correction for both circuits formed by the first and second power converters and their respective loads using a power factor correction circuit. The method further includes delivering power to the second load during an auxiliary power mode. The auxiliary power mode includes deactivating the first power converter and the power factor correction circuit, and powering the second load using the second power converter.

A power supply for delivering electrical power to a plurality of controllers in an electronic device is disclosed. According to an embodiment, the power supply includes first and second power converters each being coupled to a load, a power factor correction circuit connected to the first and second power converters, and control circuitry connected to the first and second power converters and the power factor correction circuit. The control circuitry is configured to operate the power supply in a normal power mode such that: the first and second power converters and the power factor correction circuit are active, the first and second power converters each drive their respective load, and the power factor correction circuit performs power factor correction for both circuits formed by the first and second power converters and their respective load. The control circuitry is further configured to operate the power supply in an auxiliary power mode such that: both the first power converter and the power factor correction circuit are deactivated and the second power converter is active, the second power converter drives its load, and the second power converter performs power factor correction for a circuit formed between the second power converter and its load.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein include a method of operating a power supply in a normal power mode and an auxiliary power mode such and applying power factor correction in either power mode. During normal power mode, a plurality of power supplies deliver power independently to various loads. At this time, a power factor correction circuit is operated such that its reactive components (i.e., an inductor and/or capacitor) balance out the reactance of the load and bring the power factor of the circuits formed by the power supplies closer to 1. That is, the power factor correction circuit performs power factor correction. During the auxiliary power mode, all but one of the power supplies is deactivated. Furthermore, the power factor correction circuit and any associated control circuitry are deactivated.

The remaining active power supply delivers the necessary power to the components that require power at this time. Furthermore, the remaining active power supply is able to perform its own power factor correction, if necessary. This power factor correction is done using the reactive components of the power factor correction circuit, which is deactivated. That is, the reactive components of the power factor correction circuit are shared between the power factor correction circuit and the power supply that remains active during the auxiliary power mode.

Advantageously, the embodiments described herein dispense with the need for a dedicated auxiliary power supply. Instead, one of the power supplies that also delivers power in normal mode delivers auxiliary power. Furthermore, power factor correction is performed in the auxiliary power mode using the active power supply. By leveraging the existing circuitry of the power factor correction circuit, favorable space efficiency is achieved. The power factor correction can be achieved though through the operation of a single low-power consumption switching device (e.g. a small FET) that is incorporated into the active power supply. Thus, favorable power efficiency is achieved as well.

Figure 1:
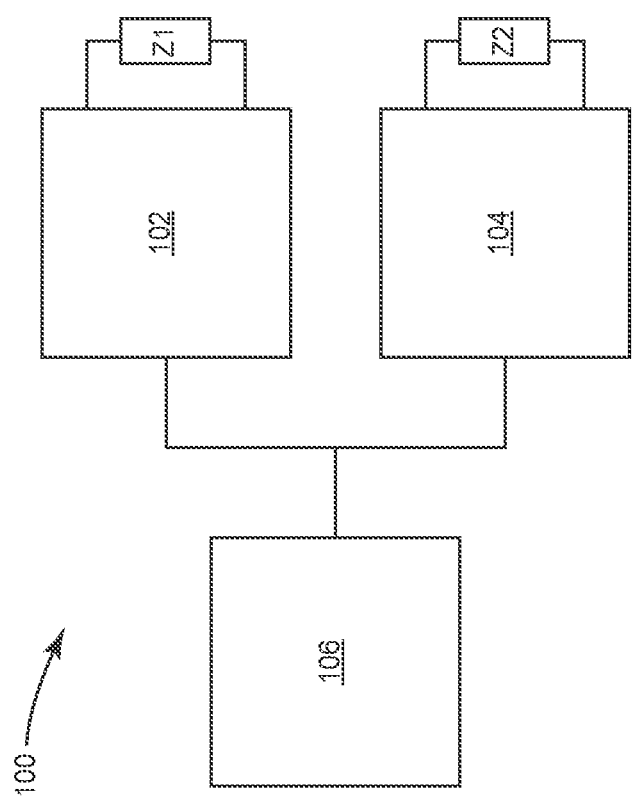
FIG. 1 illustrates a block diagram of a power supply, according to an embodiment.

Referring to FIG. 1, a block diagram of a power supply 100 is depicted, according to an embodiment. The power supply includes a first power converter 102 and a second power converter 104. The first and second power converters 102, 104 receive a voltage supply and convert one or more characteristic of the electrical signal, such as voltage magnitude, A/C-D/C, frequency, etc. The first power converter 102 is coupled to a first load Z1 and the second power converter 104 is coupled to a second load Z2. The first and second power converters 102, 104 are each configured to independently drive the first and second loads Z1 and Z2. That is, power can be delivered to the first load Z1 by the first power converter 102 without necessarily delivering power to the second load Z2 by the second power converter 104, and vice-versa.

The power supply 100 also includes a power factor correction circuit 106 connected to the first and second power converters 102, 104. More particularly, the power factor correction circuit 106 is connected with the voltage supply of the first and second power converters 102, 104 and configured to modify the circuit formed between the voltage supply of the first and second power converters 102, 104 and their respective loads Z1, Z2. That is, the power factor correction circuit 106 is able to directly influence the delivery of power from the first and second power converters 102, 104 to their respective loads Z1, Z2.

A method of operating the power supply 100 will now be discussed. According to an embodiment, the power supply 100 is operated in two different modes: a normal power mode and an auxiliary power mode. In general, the normal power mode refers to a state of the device being powered by the power supply 100 in which all of the loads being driven by the power supply 100 (e.g., the first and second loads Z1 and Z2 in the embodiment of FIG. 1) require power. By contrast, during auxiliary power mode, at least one of the loads being driven by the power supply 100 does not require power.

According to the method, the first and second power converters 102, 104 and the power factor correction circuit 106 are active during the normal power mode. "Active" refers to the fact that the first and second power converters 102, 104 and the power factor correction circuit 106 receive a supply voltage and the switching devices of these units are transitioned ON and OFF by control signaling. If, for instance, the first and second power converters 102, 104 deliver power to their respective loads Z1, Z2 using half-bridge circuits, these units are active when the switching devices of these half-bridge circuits are transitioned from ON and OFF in an alternating fashion. Likewise, the power factor correction circuit 106 is active when one of the switching devices in the power factor correction circuit 106 is switched by a control signal to perform the power factor correction operation. As those of ordinary skill will appreciate, the repeated switching of switching devices such as a MOSFET device draws power. Therefore, when the first and second power converters 102, 104 and the power factor correction circuit 106 are active, these units are drawing power. By contrast, when these units are deactivated, the switching devices are turned OFF such that these units draw essentially no power.

Also in the normal power mode, the first and second power converters 102, 104 each drive their respective loads Z1, Z2, and the power factor correction circuit 106 performs power factor correction for each circuit formed by the first and second power converters 102, 104 and their respective loads Z1, Z2. In general, power factor correction refers to a technique whereby a reactance (i.e., a capacitance or inductance) is introduced into the circuit formed by the power supply and its load in such a manner that counteracts or cancels out the reactive effects of the load. As a result, the power factor of the circuit is brought closer to 1, as the reactive component of the power transfer is reduced and the load appears more like a pure resistor.

In the auxiliary power mode, the first power converter 102 and the power factor correction circuit 106 are deactivated. That is, the switching devices of these units are turned "OFF" and therefore do not draw any power. Further, the load Z1 being driven by the first power converter 102 does not receive power. However, in the auxiliary power mode, the second power converter 104 remains active and drives its respective load Z2.

Also in the auxiliary power mode, the second power converter 104 is configured to perform power factor correction for the circuit that is formed between the second power converter 104 and its load Z2. That is, power factor correction during the auxiliary power mode can be achieved using the circuitry of the second power converter 104, while the power factor correction circuit 106 is deactivated. However, power factor correction can also be deactivated during the auxiliary power mode. If, for instance, the system is operating at very low power (e.g., below 75 W), power factor correction may be deactivated.

Figure 2:
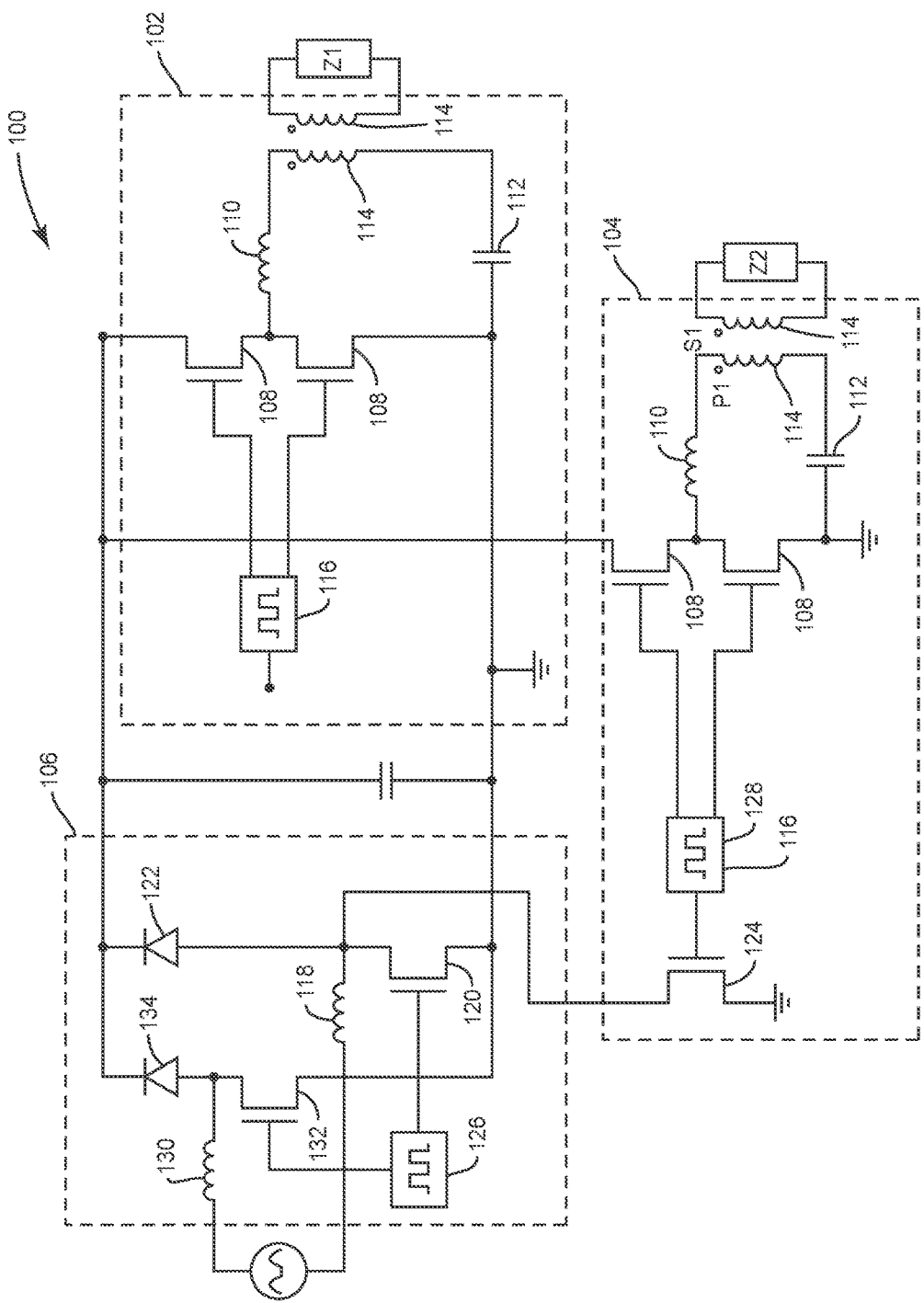
FIG. 2 illustrates a circuit topology of a power supply, according to an embodiment.

Referring to FIG. 2, an exemplary circuit topology of the power supply 100 is depicted. In general, a power converter refers to a topology of a circuit that coverts electric energy from one form to another (e.g., voltage or current transformation, AC/DC conversion, DC/DC conversion, etc.). A power converter circuit typically includes a switch network (e.g., a half bridge or full bridge circuit) that is configured to generate a modulating voltage wave upon the application of appropriate control signaling.

According to an embodiment, the first and second power converters 102, 104 are configured as so-called isolated resonant LLC power converters. In a resonant power converter, a resonant network is connected to the output of the switching network and tuned to a fundamental frequency of the modulating voltage so as approximate a sinusoid at the output of the power converter circuit. For example, as shown in FIG. 2, the resonant network is an LLC network with a series inductor 110, a series capacitor 112, and a shunt inductor (not shown). However, this is just example, and other topologies are possible for the resonant network of the first and second power converters 102, 104. That is, the embodiments described herein are not exclusively limited to LLC topologies. In general, the resonant circuit network may have any of a variety of configurations, e.g., L-C configuration, L-C-C configuration, parallel, series, etc.

In an isolated power converter, the load is electrically isolated from the power supply and there is no direct electrical connection between the two. However, the load may be electrically coupled to the power supply via magnetic fields. For example, as shown in FIG. 2, the first and second power converters 102, 104 each include transformers 114 that are configured to couple the power supply to the first and second loads Z1, Z2. However, this is just example, and the embodiments described herein are not exclusively limited to isolated topologies. In general, the first and second power converters 102, 104 can also be implemented as a direct power converter.

The first and second power converters 102, 104 each include a pair of switching devices 108. These switching devices 108 may be implemented using any power transistor with a corresponding body diode, such as a MOSFET, IGBT or GaN based HEMT. According to an embodiment, the switching devices 108 are n-type MOSFETs. Each pair of switching devices 108 is arranged in a so-called half bridge configuration, with the power delivery node of the half bridge being formed by a node that is connected between one output terminal of the high-side switching device 108 (e.g., a drain terminal) and one output terminal of the low-side switching device 108 (e.g., a source terminal).

When the first and second power converters 102, 104 are active and delivering power to their respective loads, switching signals 116 are applied to the control terminals of the switching devices 108 in each half bridge. More specifically, the high-side switching device 108 of each half bridge receives one switching signal 116 and the low-side switching device 108 of each half bridge receives another switching signal 116 that is out of phase with the other switching signal 116. The switching signals 116 are modulated in such a way that the high-side switching device 108 and the low-side switching device 108 of each half-bridge are turned ON and OFF complementary to one another. As a result, an alternating square wave voltage appears at the power delivery node of the half bridge. The LLC network of each of the first and second power converters 102, 104 is tuned to the fundamental frequency of this square wave in such a way that a sinusoidal AC voltage appears at the transformers 114. This sinusoidal AC voltage propagates across the transformers 114 in a well-known manner. The secondary side of the transformers 114 is connected to the loads Z1, Z2. A rectifying network (not shown) may be provided on the secondary side of the transformer to convert the sinusoidal AC voltage to a DC signal.

The power factor correction circuit 106 includes a first inductor 118, a first switching device 120 (e.g., a MOSFET, IGBT, etc.), and a first diode 122. An output terminal of the first switching device 120 (e.g., a source terminal) is electrically connected to the first inductor 118 and to an anode of the first diode 122. The cathode of the first diode 122 is electrically connected to the supply terminals of the half bridge for each of the first and second power converters 102, 104.

Power factor correction for the first and second power converters 102, 104 is performed using the first inductor 118. More particularly, a switching device that is electrically connected to the first inductor 118 is switched in a manner such that the first inductor 118 provides a counteracting reactance that opposes a reactance of the loads Z1, Z2 being driven by the first or second power converters 102, 104. When this switching device is conducting (i.e., turned "ON"), a current will flow through the first inductor 118, which in turn causes a magnetic field to develop across the first inductor 118. When the switching device is subsequently transitioned to a non-conducting state (i.e., turned "OFF"), the voltage across this switching device immediately rises. However, the magnetic field that has developed across the first inductor 118 will cause the first inductor 118 to resist changes in the current flowing through it. In this way, an opposite polarity reactance can be introduced into the circuit by switching the switching device that is connected to the first inductor 118 at the appropriate time.

In the embodiment of FIG. 2, the first switching device 120 that is part of the power factor correction circuit 106 is directly electrically connected to the first inductor 118 and is configured to perform power factor correction in the above described manner. Furthermore, the second power converter 104 includes a second switching device 124 that is also connected to the first inductor 118 via the interconnections connecting the power factor correction circuit 106 to the second power converter 104. The second switching device 124 is also configured to perform power factor correction in the above described manner. Thus, the power factor correcting reactance of the first inductor 118 can be directly controlled by the power factor correction circuit 106 using the first switching device 120 or it can be remotely controlled by the second switching device 124 of the second power converter 104. If the power supply 100 is operating in the auxiliary power mode and power factor correction is not required (e.g., at power levels below 75 W), the second switching device 124 can be used as a pre-regulator for the second power converter 104 and operated in burst mode to reduce power consumption. If the power supply 100 is operating in the auxiliary power mode and power factor correction is required (e.g., at power levels at or above 75 W), the second switching device 124 can be operated to perform power factor correction in the manner described above.

Optionally, the power factor correction circuit 106 may include a second inductor 130, a third switching device 132 and a second diode 134, with each component being in parallel with the first inductor 118, first switching device 120, and a first diode 122, respectively. The third switching device 132 can be operated in conjunction with the second inductor 130 and the second diode 134 in a similar manner as described above to provide power factor correction. In this way, each side of the power factor correction circuit 106 is used to provide a proportion (e.g., 50%) of the overall power factor correction.

According to an embodiment, only one of the power factor correction circuit 106 or the second power converter 104 performs power factor correction at any one time. When the power supply 100 is operating in the normal power mode, the first switching device 120 is switched by a first control signal 126 and the second switching device 124 is turned OFF. Thus, during normal power mode, the first control signal 126 is used to provide power factor correction for each circuit formed by the first and second power converters 102, 104 and their respective loads Z1, Z2. When the power supply 100 is operating in auxiliary power mode, the second switching device 124 can be switched by a second control signal 128 and the first switching device 120 is turned OFF. Thus, in the auxiliary power mode, the second control signal 128 can be used to provide power factor correction for the circuit formed by the second power converter 104 and its load Z2.

The first and second control signals 126, 128 as well as the switching signal 116 can be generated by control circuitry, such as a microcontroller or equivalently programmed memory and switching devices that is connected to the first and second power converters 102, 104 and the power factor correction circuit 106. Among other things, this control circuitry generates control signals responsible for power factor correction as well as the control signals responsible for switching the half bridges of the first and second power converters 102, 104. In addition, this control circuitry can activate and deactivate the power factor correction circuit 106 and the first and second power converters 102, 104 based on which mode of operation (i.e., normal power supply mode or auxiliary power supply mode) that the power supply 100 is operating in. Each of the first and second power converters 102, 104 and the power factor correction circuit 106 can have their own control circuitry. For example, each of these circuits can be implanted in discrete boards or cards, with each board or card having its own microcontroller. In this case, the connection between the circuits is provided by a top-level board. Alternatively, the control circuitry for both the power factor correction circuit 106 and the first and second power converters 104, 104 can be provided by a master controller that is external to each circuit, but configured to control each circuit remotely.

According to an embodiment, the power factor correction circuit 106 and the second power converter 104 each have independent control circuitry. Thus, the control circuitry dedicated to the power factor correction circuit 106 can be deactivated while the control circuitry dedicated to the second power converter 104 remains active. In this way, power consumption during auxiliary power mode is advantageously minimized because the power factor correction circuit 106 and its associated control circuitry can all be deactivated. Furthermore, in this case, second power converter 104 only needs to dedicate one switch (i.e., the second switching device 124) to perform power factor. This dedicated switch can be tailored for low power consumption, e.g., by appropriately setting the channel width, gate capacitance, etc. In this way, the second power converter 104 is able to perform power factor correction at reduced power than the power factor correction circuit 106 otherwise could.

In the embodiment of FIG. 2, the power factor correction circuit 106 has a so-called interleaved power factor correction topology. An interleaved topology may include an EMI filter (not shown) and a bridge network (not shown). The AC line voltage is rectified using the bridge network. The supply terminals of the first and third switching devices 120, 132 therefore receive a rectified AC voltage supply.

Figure 3:
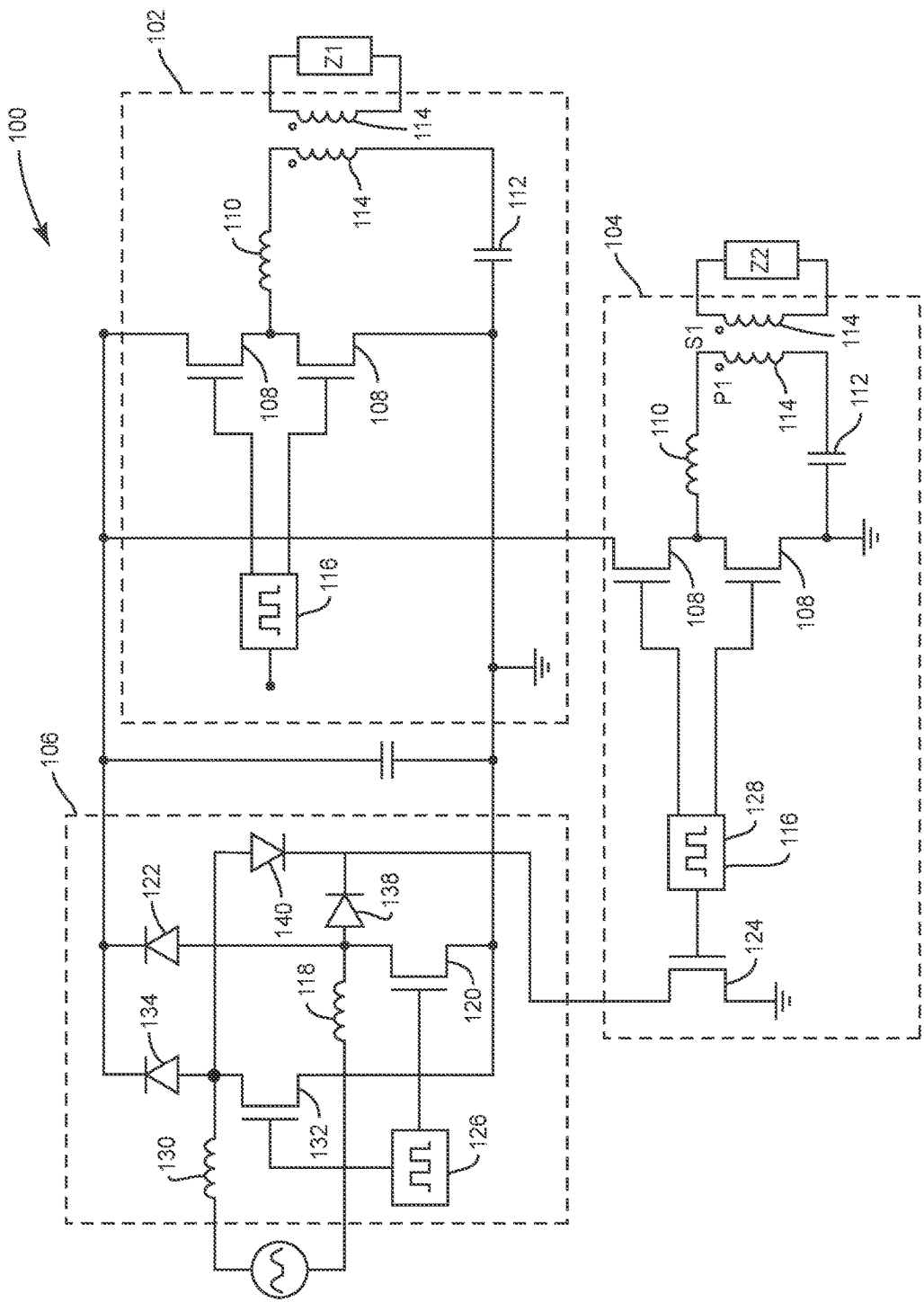
FIG. 3 illustrates a circuit topology of a power supply, according to another embodiment.

Referring to FIG. 3, an exemplary circuit topology of the power supply 100 is depicted, according to another embodiment. The power supply 100 of FIG. 3 may be substantially similar or identical to the power supply 100 of FIG. 2, except that the power factor correction circuit 106 is configured as a so-called bridgeless power factor correction circuit 106. A bridgeless topology may be preferable over an interleaved due to its power consumption. In a bridgeless topology, the diode bridge can be eliminated. This advantageously reduces power by reducing the number of circuit components connected between the supply and load the dissipate power. Furthermore, this can lead to a reduced heatsink size, as the bridge diode loss is removed from the system.

The bridgeless power factor correction circuit 106 is configured such that the AC line voltage is directly coupled to the supply terminals of the first and third switching devices 120, 132. The bridgeless configuration of the power factor correction circuit 106 includes fourth and fifth diodes 138, 140. The anodes of the fourth and fifth diodes 138, 140 are connected together and the cathodes of the fourth and fifth diodes 138, 140 are connected to the output of the first and third switching devices 120, 132, respectively. In this way, the fourth and fifth diodes 138, 140 replace the diode bridge required for an interleaved configuration.

With a bridgeless configuration of the power factor correction circuit 106, the second switching device 124 of the second power converter is connected to either one of the first and second inductors 118, 130 via the fourth and fifth diodes 138, 140. Thus, during the auxiliary power mode, second switching device 124 can be operated such that either one of the first and second inductors 118, 130 provide power factor correction in the manner previously discussed.

The term "directly electrically connected," "electrically connected," and the like describe a permanent low-ohmic connection between electrically connected elements, for example a direct contact between the concerned elements or a low-ohmic connection via a metal and/or highly doped semiconductor.

The term "electrically coupled" indicates that one or more intervening element(s) adapted for signal transmission may be provided between the electrically coupled elements, for example two electrically coupled elements may have transformers and/or transistors between them. In this case, the elements are electrically coupled, but not directly electrically connected.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of operating a power supply comprising first and second power converters each being coupled to a load, and a power factor correction circuit connected to the first and second power converters, the method comprising:
    operating the power supply in a normal power mode such that: the first and second power converters and the power factor correction circuit are active, the first and second power converters each drive their respective load, and the power factor correction circuit performs power factor correction for each circuit formed by the first and second power converters and their respective load; and
    operating the power supply in an auxiliary power mode such that: both the first power converter and the power factor correction circuit are deactivated and the second power converter is active and the second power converter drives its load, and
    wherein operating the power supply in the auxiliary power mode comprises performing power factor correction by connecting a reactive component from the power factor correction circuit to the load being driven by the second power converter using the second power converter.

2. The method of claim 1, wherein the power factor correction circuit comprises a first inductor and a first switching device, the method further comprising:
    using the first inductor to perform the power factor correction during either the normal power mode or the auxiliary power mode.

3. The method of claim 2, wherein performing the power factor correction during either the normal power mode or the auxiliary power mode comprises switching a switching device that is directly electrically connected to the first inductor such that the first inductor provides a counteracting reactance that opposes a reactance of the load being driven by the first or second power converters.

4. The method of claim 3, wherein the first switching device of the power factor correction circuit and a second switching device of the second power converter are directly electrically connected to the first inductor, wherein performing power factor correction during the normal power mode comprises switching the first switching device, and wherein performing power factor correction during the auxiliary power mode comprises switching the second switching device.

5. The method of claim 4, wherein the power factor correction circuit and the second power converter each comprise independent control circuitry, wherein performing the power factor correction during the normal power mode comprises generating a first control signal that switches the first switching device using the control circuitry that is associated with the power factor correction circuit, and wherein performing power factor correction during the auxiliary power mode comprises generating a second control signal that switches the second switching device using the control circuitry that is associated with the second power converter.

6. The method of claim 5, wherein the control circuitry that is associated with the power factor correction circuit is deactivated during the auxiliary power mode.

7. The method of claim 5, wherein the first switching device of the power factor correction circuit is switched off during the auxiliary power mode, and wherein the second switching device of the second power converter is switched off during the normal power mode.

8. The method of claim 2, wherein the first and second power converters each comprise a half bridge formed by a pair of switching devices, wherein the first and second power converters are active when the switching devices of each half bridge are being switched, and wherein the power factor correction circuit is active when the first switching device is being switched.

9. The method of claim 2, wherein the power factor correction circuit is configured as an interleaved power factor correction circuit, and wherein performing power factor correction comprises applying a rectified AC voltage to the first inductor.

10. The method of claim 2, wherein the power factor correction circuit is configured as a bridgeless power factor correction circuit, and wherein performing the power factor correction during the auxiliary power mode comprises using either one of the first and second inductors to provide a counteracting reactance that opposes a reactance of the load being driven by the second power converter.

11. A method of delivering power in an electronic device, the method comprising:
    delivering power independently to first and second loads during a normal power mode, the normal power mode comprising: powering the first load using a first power converter, powering the second load using a second power converter, and performing power factor correction for both circuits formed by the first and second power converters and their respective loads using a power factor correction circuit; and
    delivering power to the second load during an auxiliary power mode, the auxiliary power mode comprising: deactivating the first power converter and the power factor correction circuit, powering the second load using the second power converter, and performing power factor correction by connecting a reactive component from the power factor correction circuit to the second load using the second power converter.

12. The method of claim 11, wherein the power factor correction circuit comprises a first inductor and a first switching device, wherein the second power converter comprises a second switching device, wherein the power factor correction circuit performs power factor correction during the normal power mode by switching the first switching device such that the first inductor provides a counteracting reactance that opposes a reactance of a load being driven by the first or second power converters, and wherein the second power converter performs power factor correction during the auxiliary power mode by switching the second switching device such that the first inductor provides a counteracting reactance that opposes the reactance of the load being driven by second power converter.

13. The method of claim 12, wherein the power factor correction circuit and the second power converter each comprise independent control circuitry, wherein the first switching device of the power factor correction circuit is switched off during the auxiliary power mode by the control circuitry associated with the power factor correction circuit, and wherein the second switching device of the second power converter is switched off during the normal power mode by the control circuitry associated with the second power converter.

14. A power supply for delivering electrical power to a plurality of controllers in an electronic device, the power supply:
    first and second power converters each being coupled to a load;
    a power factor correction circuit connected to the first and second power converters; and
    control circuitry connected to the first and second power converters and the power factor correction circuit, wherein the control circuitry is configured to operate the power supply in a normal power mode such that: the first and second power converters and the power factor correction circuit are active, the first and second power converters each drive their respective load, and the power factor correction circuit performs power factor correction for both circuits formed by the first and second power converters and their respective load, and wherein the control circuitry is configured to operate the power supply in an auxiliary power mode such that: both the first power converter and the power factor correction circuit are deactivated and the second power converter is active, the second power converter drives its load, and the second power converter performs power factor correction for a circuit formed between the second power converter and its load.

15. The power supply of claim 14, wherein the power factor correction circuit comprises a first inductor, wherein the power supply comprises a switching device that is directly electrically connected to the first inductor, and wherein the control circuitry is configured to perform the power factor correction during either the normal power mode or the auxiliary power mode with the switching device that is directly electrically connected to the first inductor.

16. The power supply of claim 15, wherein the power factor correction circuit comprises a first switching device that is directly electrically connected to the first inductor, wherein the second power converter comprises a second switching device that is coupled to the first inductor, wherein the power factor correction circuit and the second power converter each comprise independent control circuitry, wherein the control circuitry of the power factor correction circuit is configured to switch the first switching device during the normal power mode such that the first inductor provides a counteracting reactance that opposes a reactance of the load being driven by the first or second power converters, wherein the control circuitry of the second power converter is configured switch the second switching device such that the first inductor provides a counteracting reactance that opposes the reactance of the load being driven by the second power converter.

17. The power supply of claim 14, wherein the first and second power converters are isolated power converters.

18. The power supply of claim 17, wherein the first and second power converters are LLC resonant power converters.

* * * * *